Figure 3:
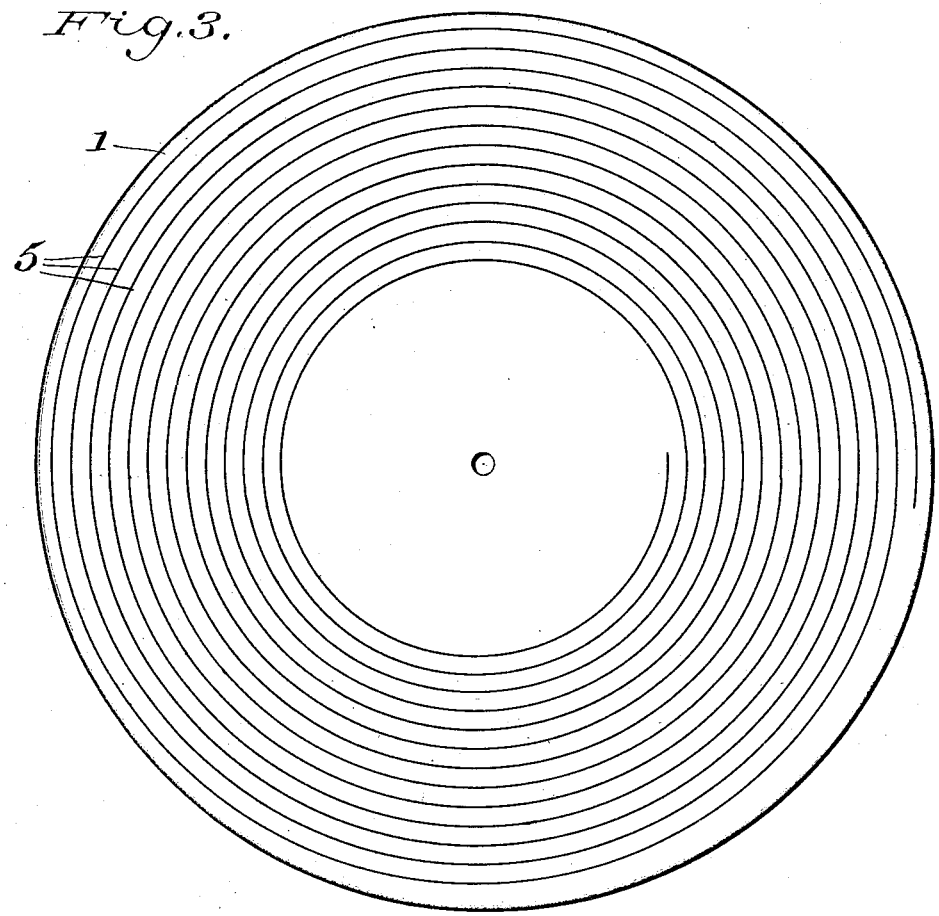

No. 749,092. PATENTED JAN. 5, 1904.
A. N. PETIT.
DOUBLE FACED SOUND RECORD.
APPLICATION FILED JAN. 7, 1901.
NO MODEL. 2 SHEETS—SHEET 1.
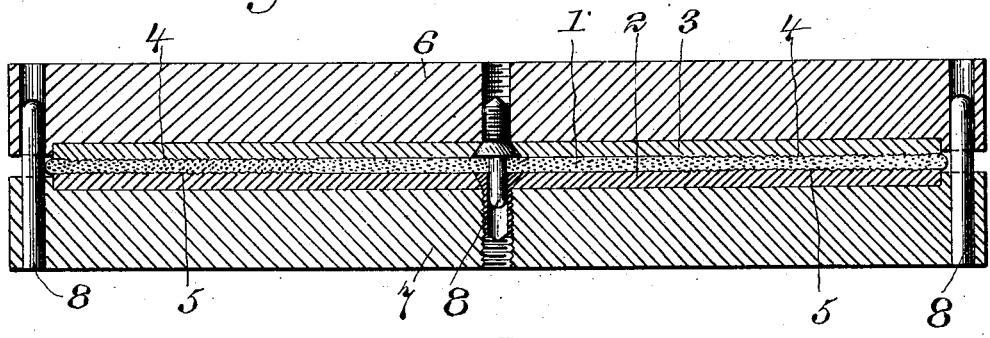
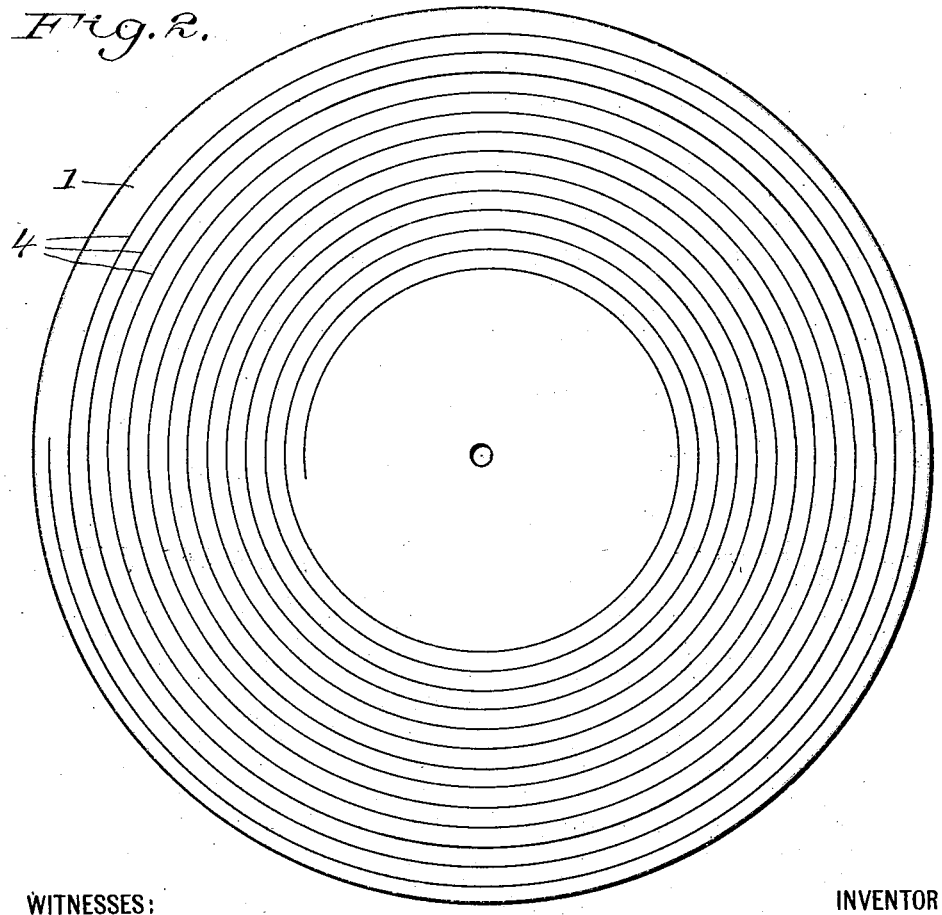
WITNESSES:
INVENTOR No. 749,092. PATENTED JAN. 5, 1904.
A. N. PETIT.
DOUBLE FACED SOUND RECORD.
APPLICATION FILED JAN. 7, 1901.
NO MODEL. 2 SHEETS—SHEET 2.

WITNESSES:
R. Gerbracht, Jr.
W. H. Pumphrey.

INVENTOR
Ademor N. Petit
BY
H. Parker Smith
ATTORNEY

No. 749,092. Patented January 5, 1904.

UNITED STATES PATENT OFFICE.

ADEMOR N. PETIT, OF NEWARK, NEW JERSEY, ASSIGNOR OF ONE-HALF TO F. M. PRESCOTT, OF NEW YORK, N. Y.

DOUBLE-FACED SOUND-RECORD.

SPECIFICATION forming part of Letters Patent No. 749,092, dated January 5, 1904.

Application filed January 7, 1901. Serial No. 42,337. (No model.)

*To all whom it may concern:*

Be it known that I, ADEMOR NAPOLEON PETIT, a citizen of the United States of America, and a resident of Newark, State of New Jersey, have invented certain new and useful Improvements in Double-Faced Sound-Records, of which the following is a specification.

My invention relates to talking-machines, and aims to provide a novel and improved sound-record disk of the type in which the sound-record is impressed in the form of a spiral groove which receives and directs the reproducing-stylus of the talking-machine. Prior to my invention disks of this character have generally been made from a material resembling hard rubber or vulcanite and of which shellac is usually an important element. A mass of this material rendered plastic by heat has been placed on a flat smooth table or platen and there subjected to heavy compression under a matrix upon which the desired sound-record is reproduced in relief. This matrix flattens out the plastic material into flat disk form and leaves its impress therein in the form of a spiral groove which is the counterpart of the relief portion or portions of the matrix. It has been found in practice that the radial flow or spread of the plastic material under compression between the smooth-faced table or platen and the roughened matrix is unequal, the flow or spread being more pronounced next the table or platen because of the absence thereat of any roughness or relief portions to resist it. The relief portions of the matrix act as so many bars of resistance to retard or prevent radial flow or spread of the material adjacent thereto. While this unequal flow of plastic material at opposite faces of the disk necessarily results in a disturbed molecular structure which impairs the quality of the sound reproduced therefrom, probably the most serious consequence of this unequal flow is the failure of the plastic material to be pressed into intimate contact with all the surface or surfaces of the matrix. This will readily be appreciated when it is considered that the material under compression tends to follow the lines or planes of least resistance, and if it can spread over the flat smooth-faced platen or table more easily than it can be pressed into the recesses or grooves between and adjacent the relief portions of the matrix then the impress of the latter will be more or less imperfect. In practice it has been found that a considerable percentage of disks are rejected because of imperfect pressing, particularly in the vicinities of the peripheries of the disks, due to the fact that near the peripheries the plastic material oozes out from beneath the matrix much more readily than it will penetrate into intimate contact with and behind the relief portions of the matrix.

My invention comprehends employing two opposing matrices between which the mass of plastic material is compressed under heavy pressure, thereby to produce a double-record-faced disk. The sound-record at either face of such a disk is superior in quality and perfection to that of the single record of a single-record-faced disk made as heretofore, because the presence of the opposing matrices with their roughened or relief surfaces resists radial flow or spread of material equally at both faces of the disk, thus not only reducing the flow, but insuring uniformity at both faces of the disk of whatever flow there may be. Thus the molecular structure is much less disturbed than by the prior method, and, what is more important, the resistance to flow thus obtained at opposite faces of the disk causes the plastic material to be pressed more completely and uniformly into intimate contact with the entire surfaces of both matrices than has heretofore been possible where a single-sound-record matrix only has been used. Thus each of the two records which may be obtained in a single disk in this manner is superior to records heretofore obtained by employing a single matrix producing a single-record face only upon a disk. The opposite records which may be thus obtained in opposite faces of each single disk are necessarily phonetically uniform, since they are impressed simultaneously under similar conditions in one and the same mass of material, making it possible successfully to have one record at one face of a disk, a continuation of another record at the opposite face of the disk, the two to be reproduced in succession as for the rendition of a more extended composition than can be recorded upon a single face of the disk without any phonetic difference between the two. This has been found quite impracticable heretofore where single-record-faced disks alone have been used because of the lack of phonetic uniformity in records necessarily produced at different times under different conditions.

The preferred form of my invention and one form of apparatus for producing the same are illustrated in the accompanying two sheets of drawings, in which—

Figure 4:
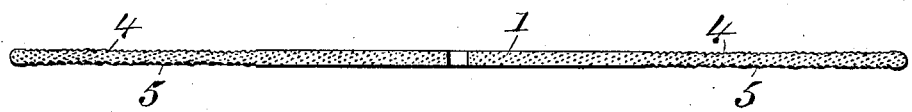

Figure 1 is a sectional view illustrating the arrangement of matrices, &c., and the manner of impressing the record-grooves upon both faces of the disk by a single operation; Figs. 2 and 3, similar views of the opposite faces of a disk, showing the record-grooves impressed therein, the same being illustrated in diagram and greatly exaggerated in order to clearly represent the special form thereof; and Fig. 4 is a central transverse sectional view of the finished disk.

Throughout the figures of the drawings like reference-figures indicate like parts.

A disk 1, of any suitable material or composition of matter in which the record-groove may be impressed while the material is plastic and which will become sufficiently hard and indestructible when set, is compressed between two matrices or dies. I prefer to employ a composition resembling hard rubber or vulcanite, of which shellac usually is an important element and which while quite dense or hard when cold or set may be rendered sufficiently plastic for working by the application of heat thereto. Each of these matrices has preferably a spiral line in relief on its face, which forms a corresponding groove in the disk. Thus the disk is formed with one sound-record groove in one face and another sound-record groove in the other. Both these spirals preferably run from circumference to center of the disk and run in opposite directions in the disk, so that when the disk is turned over or reversed the sound reproduction will result from rotation of the disk in the same direction—say from left to right, as one looks down upon the talking-machine. While it is obviously commercially preferable to have the grooves at both faces of the disk in the form of sound-record grooves, and thus available for sound reproduction, obviously the improved quality of sound-record grooves which results from my invention is essentially the same whether the impression or impressions in the opposite disk-face is or are sound record or records. For example, the groove marked 5 may not be a sound-record, yet its effect upon the quality of the opposite record-face would be essentially the same as if it were a sound-record.

Of course various arrangements of apparatus and detailed methods of procedure may be employed in producing the novel article of manufacture which embodies my invention. In Fig. 1 I have have shown two matrices, which are usually electrotypes, carried by heavy plates 6 and 7, which are provided with dowel-pins 8 8 and corresponding recesses to act as guides. These plates may be placed in a hydraulic or other powerful press, and by the pressure thus given to them the spiral grooves are impressed in the contained plastic disk 1, of suitable material, which then sets in cooling, the setting taking place mainly while the disk still remains between the matrices. As the material is reduced to thin disk-like form during the compression, if its cooling or setting were not properly controlled it would be likely to set partially before the full impress had been made therein. Hence it is customary to maintain the matrices more or less heated during the compression, so as to prevent too rapid setting of the material, the heat, however, being insufficient to retain the material in plastic condition.

The advantages of my invention are obvious. The semiplastic material being held between two roughened matrices, the tendency to flow from center to circumference under the great pressure used in impressing is resisted and a record-disk of greater density is produced. The material is also thinnest at that part of the disk in which the record groove or grooves are formed, the under surface of the disk being indented opposite the record-groove on the upper surface. This greater density means that the molecules have been forced closer together. This reduces the scraping or hissing sound which usually accompanies sound reproduction in a talking-machine. This scraping or hissing or series of sounds like small explosions are produced by the stylus jumping across the minute spaces between the molecules. The noise is therefore reduced when the molecules are arranged more closely together. The roughened or relief faces of the opposing matrices reduce and at the same time equalize the flow or spread of material at opposite faces of the disk and enforce a more perfect and intimate contact thereof with every essential part of each matrix-surface than has heretofore been possible, so that the plastic material after having been compressed and impressed sets initially in a condition which produces an exact counterpart of each matrix opposed thereto. When the under groove is also a sound-record, two records can be impressed at the same cost for material and labor as heretofore required for one. Comparative renditions of the same musical or other composition may be conveniently associated for reproduction. Thus the same song—"Annie Laurie," for instance—may be recorded when sung as a solo on one side of the disk and when sung as a quartet on the other. Hamlet's soliloquy as spoken by an English actor might be recorded on one side of the disk, and the same soliloquy as spoken by a French actress might be stamped on the other.

Also any composition too extensive to be recorded upon a single disk-face may be recorded in part upon one such face and in part upon the opposite face with certainty that there will be no disparity or objectionable difference between the renditions of the two parts of the same composition, with absolute certainty of phonetically-uniform results, which has been quite impossible heretofore where the successive renditions are from records successively produced under varying conditions. In this way I am enabled to produce sound-records of increased value as an agency for instruction, amusement, and the perpetuation of interesting comparisons. Another advantage is that the indentations on the under surface of the disk, whether in the form of grooves of any kind or of sound-record grooves or of other form, heighten the frictional adhesion of the disk to the felt with which the rotating table of the machine is usually faced, and thereby decreases the necessity for special clamping means, and so facilitates the use of the record-disk in the reproduction of sounds.

I claim—

1. As a new article of manufacture, a sound-record consisting of a disk of hardened plastic material presenting oppositely-facing, phonetically-uniform sound-records impressed into the plastic material and fixed or set therein by the initial setting of the disk.

2. As a new article of manufacture, a disk of homogeneous, hardened, plastic and dense material having a sound-record on both of its opposite faces formed by compressing a body of such material in a plastic condition between opposite templets each of which is roughened by a sound-record.

3. As a new article of manufacture, a sound-record consisting of a disk presenting oppositely-facing sound-records impressed therein.

4. The process of making double-faced sound-record disks of uniform phonetic quality on both sides and from center to periphery on each side which consists in compressing a plastic homogeneous mass between two templets each of which is roughened as by having a sound-record formed in relief thereon and thereby causing the radial flow of material in assuming its final shape to be alike at both faces.

Signed at New York, N. Y., this 5th day of January, 1901.

ADEMOR N. PETIT.

Witnesses:
W. H. PUMPHREY,
L. E. PEARSON.